United States Patent
Eagle et al.

(10) Patent No.: US 6,771,175 B1
(45) Date of Patent: Aug. 3, 2004

(54) METHOD FOR DEMONSTRATING RELIABILITY OF OCCUPANT CLASSIFICATION SYSTEMS

(75) Inventors: Paul J. Eagle, Bloomfield Hills, MI (US); Vishwas Y. Bawle, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 20 days.

(21) Appl. No.: 10/310,799

(22) Filed: Dec. 6, 2002

(51) Int. Cl.[7] .............................................. G08B 23/00
(52) U.S. Cl. ................ 340/573.1; 340/436; 340/438; 701/45; 701/46; 280/735; 280/734; 280/733
(58) Field of Search ................. 701/45, 46; 340/573.1, 340/436, 438; 280/735, 734, 733

(56) References Cited

U.S. PATENT DOCUMENTS

| | | | | |
|---|---|---|---|---|
| 6,058,341 A | * | 5/2000 | Myers et al. ................. | 701/45 |
| 6,246,936 B1 | * | 6/2001 | Murphy et al. ................ | 701/45 |
| 6,329,913 B1 | * | 12/2001 | Shieh et al. ................. | 340/561 |
| 6,438,476 B1 | * | 8/2002 | Gray et al. .................... | 701/45 |
| 6,438,477 B1 | * | 8/2002 | Patterson et al. ............. | 701/45 |
| 6,609,054 B2 | * | 8/2003 | Wallace ........................ | 701/45 |
| 6,653,577 B2 | * | 11/2003 | Breed et al. ................. | 177/144 |
| 6,689,960 B2 | * | 2/2004 | Aoki ........................ | 177/25.13 |

* cited by examiner

*Primary Examiner*—Daniel J. Wu
*Assistant Examiner*—Tai T. Nguyen
(74) *Attorney, Agent, or Firm*—Ralph E. Smith

(57) ABSTRACT

In a method and apparatus for verifying that an occupant sensing system reliably classifies vehicle seat occupants as adults or children, a small number of systems is tested using test objects that have physical characteristics representative of a lower limit adult and an upper limit child. Average measured parameter values are calculated for each test object, as well as standard deviation. Margins are then calculated for each of the two test objects, using separate statistical formulas. If the margins for both objects are non-negative, it is concluded that the system demonstrates a minimum reliability, with a desired confidence level.

15 Claims, 4 Drawing Sheets

METHOD FOR DEMONSTRATING RELIABILITY OF OCCUPANT CLASSIFICATION SYSTEMS

BACKGROUND OF THE INVENTION

The present invention relates to a method and apparatus for evaluating validation test results for critical vehicle safety systems, such as an occupant classification system associated with a passenger airbag deployment system. In particular, the invention relates to a method and apparatus for assuring that a newly designed system for classifying an occupant of a vehicle seat has the capability of demonstrating minimum reliability, with a desired level of confidence.

In order to limit the risk of death or serious injury in the event of a crash, modern vehicles include passenger airbags, which are designed to deploy in the event that the vehicle impacts with another object in certain cases. For this purpose, various types of sensors may be used, and criteria are established for determining when a qualified impact has occurred. However, with such systems, it is known that deployment of certain airbags can itself cause serious injuries in those instances where the occupant of the vehicle seat is a small child, or an infant in a Rearwardly Facing Infant Seat (RFIS). Accordingly, regulations have been developed requiring a system for distinguishing those situations in which the seat is occupied by a small child or an RFIS (in which case, the airbag deployment should be suppressed or limited in its power), from those by an adult (in which the case the airbag deployment should be enabled).

Various types of systems have been proposed for making the distinction referred to previously, such as U.S. Pat. No. 6,438,477; U.S. Pat. No. 6,438,476; U.S. Pat. No. 6,246,936; and U.S. Pat. No. 6,012,007. In general these systems utilize sensors to measure parameters that characterize the vehicle seat occupant. For example, such sensors may generate output signals indicative of occupant weight. In a crash situation, (in which the crash sensors referred to previously output signals indicative of an impact with an object), a determination is made whether the output signals from seat occupant sensors exceed a threshold value (hereinafter sometimes referred to as a "suppression/enable threshold"). If so, deployment of the passenger airbag is enabled. If not, it is assumed that the occupant of the vehicle seat is either a small child or an RFIS, and deployment of the airbag is suppressed or limited in its power.

When a new system is designed for discriminating between children (including RFIS) and small adults, it is necessary that it be tested in order to establish that the system demonstrates, with acceptable reliability at a level of confidence, that it is capable of complying with certain federal motor vehicle safety standards. That is, the system must discriminate between children and small adults, so that the passenger airbag can be suppressed or enabled in accordance with the certification requirements of the federal regulation. In order to assure, to a desirable level of confidence, that the new system satisfies the established regulatory requirements, it is necessary to conduct tests.

Since the classification for systems such as airbag deployment controls generates a "yes/no" type result (that is, occupants will be classified as satisfying the criteria for airbag deployment, or not) in a critical safety system, conventional test methods also look for a yes/no outcome. This requires a very large number of test properties to be tested for typical Reliability goals. That is, demonstration of the requisite reliability in such circumstances has heretofore required that large numbers of systems and/or components be tested, in order to establish that the newly designed system properly distinguishes between small adults and children (including RFIS) with sufficient consistency. Typically, the systems or components in question must be evaluated prior to volume production when the cost of prototypes is quite high. Accordingly, the need to test large numbers of systems increases development costs significantly, and imposes a substantial time requirement.

It is an object of the present invention to provide a method and apparatus for verifying that an occupant sensing system will reliably classify occupants in accordance with the requirements of the federal motor vehicle safety standards.

Another object of the invention is to provide a method and apparatus for evaluating the capability of the system to discriminate between relevant classes of occupants, e.g., children and small adults, such that the passenger airbag can be suppressed or enabled in accordance with the certification requirements of the federal regulation.

Still another object of the invention is to provide a method and apparatus which can demonstrate satisfactory reliability of the system, with a small number of test samples.

Finally, still another object of the invention is to provide a method and apparatus for demonstrating that a critical system, which generates a pass/fail type of result achieves a satisfactory level of reliability, with a desired degree of confidence, using a relatively small number of test samples.

SUMMARY OF THE INVENTION

The method and apparatus according to the invention call for testing a small number of systems (vehicles or seats which include the discrimination system that is to be tested) to demonstrate the minimum reliability of a passenger occupant classification system for controlling a passenger airbag, while retaining a statistically sound basis for inferring minimum reliability at a satisfactory confidence level. The method calls for placing "limiting case" Anthropomorphic Test Devices (ATDs), sometimes referred to as "crash test dummies", in a passenger seat which contains the system being tested. The limiting case ATDs are those which represent the largest occupant that is to be classified as suppressing an airbag, and the smallest occupant which is to be classified as enabling the airbag. For example, a classification causing the passenger airbag to be suppressed will occur for a child or RFIS, while a classification causing the passenger airbag to be enabled will occur for a fifth percentile female (a female which falls at the fifth percentile for size or weight). The sensor output that is used to classify the occupant is then recorded for both limiting case ATDs for each sample of the system being tested. (The sensor output may, for example, be indicative of weight, cushion pressure, a weighted summation of sensor outputs, or other scalar parameter.) Tests are then run for a series of "n" systems (samples), as described hereinafter.

The mean or average sensor output value, and the standard deviation are then computed for the n samples of sensor output, for each of the two limiting case ATDs. Assuming that the sensor system utilized is such that a larger occupant produces a larger value of the sensed parameter, two "margins" are then computed. The suppress limiting case (child/RFIS) margin is computed as the surplus of the suppression/enable threshold value which is to be used for discriminating between the two types of occupants beyond a value determined as the mean of the suppress limiting case measured values plus a constant multiplied by the sample standard deviation of the suppress limiting cases. The enable limiting case margin is computed as the surplus of a quantity calculated as the mean of the enable limiting cases minus a constant multiplied by the standard deviation of the enabling limiting case, beyond the suppression/enable threshold. The constant is selected from known statistical lookup tables (based on the Non-Central t-Distribution), tabulated corresponding to the number of samples (typically three to eight), the minimum reliability that is to be demonstrated, and the desired degree of confidence. It is assumed that the measurement reading for a given ATD in a vehicle is a random variable whose distribution is Normal (bell-shaped) across the vehicle population.

If both of the two "margins" calculated in the manner described above are non-negative, the minimum level of reliability at the desired confidence level is demonstrated by the system.

The technique according to the invention can also be used to evaluate the feasibility of setting a "suppression/enable threshold value" for a particular sensing system, such that the system is able to reliably discriminate between two classes of seat occupants. For this purpose, assuming once again that a larger occupant produces a larger value of the sensed parameters, two "bounds" are computed as follows. The suppress limiting case bound is the mean of the values sensed for the suppressed limiting cases plus an appropriate constant multiplied by the sample standard deviation of the suppress limiting cases. The enable limiting case bound is then determined as the mean of the enable limiting cases minus the appropriate constant times the standard deviation of the enabling limiting cases. (The constant is selected in the manner described previously.) If the latter bound exceeds the former, then it is feasible to set a threshold while demonstrating the minimum level of reliability at the desired confidence for the system under test.

Other objects, advantages and novel features of the present invention will become apparent from the following detailed description of the invention when considered in conjunction with the accompanying drawings.

DETAILED DESCRIPTION OF THE INVENTION

Figure 1:
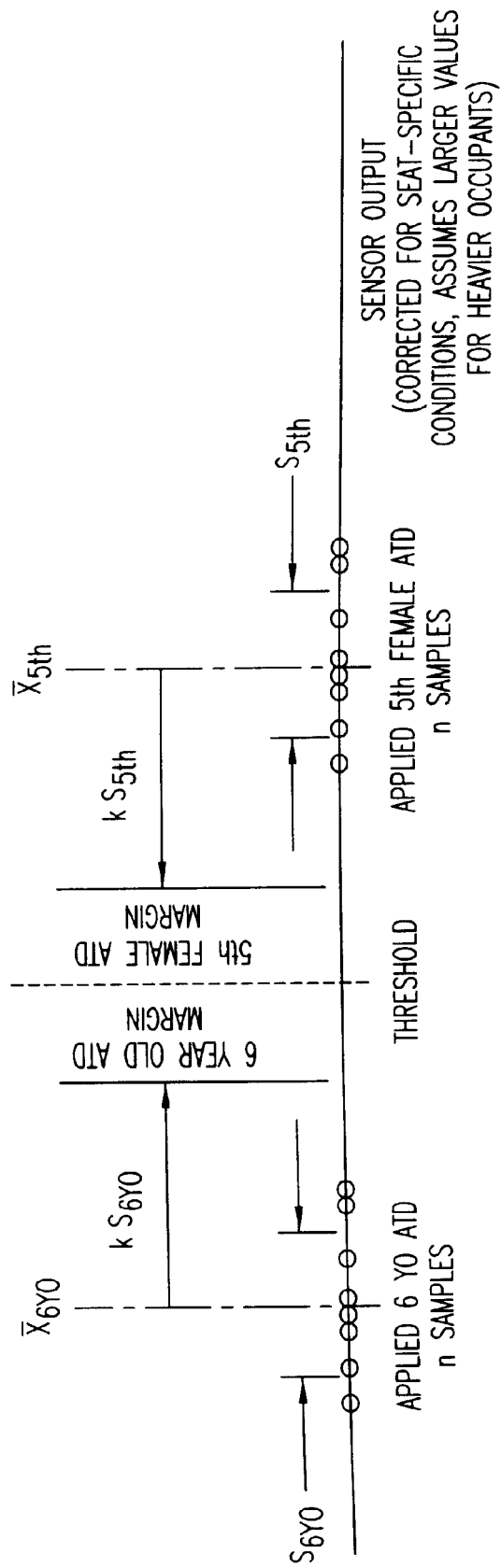
FIG. 1 is a graphic depiction of the test results, and calculated values for performing the method according to the present invention.

FIG. 1 is a graphic depiction of test results and the calculated values that are utilized according to the invention to determine whether a system that is being tested demonstrates the required reliability standards, with a satisfactory degree of confidence. For this purpose, tests are run, and sensor values are determined for each of the "n" systems in the sample, utilizing two ATDs having physical characteristics representative of a fifth percentile female ATD and a six-year old child, respectively.

In FIG. 1, the suppression/enable threshold value, used for determining whether a triggering of the passenger airbag should be suppressed or enabled based on signals from the system sensors, is shown as a heavy vertical broken line. Test results (measured values) for each of the n samples (in this case n equals eight), are shown along the horizontal axis. Based on these results, the averages ($\overline{X}_{6YO}$ and $\overline{X}_{5th}$) and the sample standard deviations ($S_{6YO}$ and $S_{5th}$) are calculated for the six-year old ATD and the fifth percentile adult female ATD, respectively. Thereafter, a margin (M6YO) is calculated for the six-year old ATD, as the surplus of the suppression/enable threshold beyond $\overline{X}_{6YO}+KS_{6YO}$. Another margin (M5th) ia also calculated for the fifth percentile female ATD, as the surplus of $\overline{X}_{5th}-KS_{5th}$ beyond the threshold, as follows:

$$M_{6YO} = \text{Threshold} - (\overline{X}_{6YO}+KS_{6YO}), \text{ and} \quad \text{(Eq. 1)}$$

$$M_{5th} = (\overline{X}_{5th}-KS_{5th}) - \text{Threshold} \quad \text{(Eq. 2)}$$

wherein K=an appropriately selected constant.

If both of these margins are non-negative, the system being tested is considered to have demonstrated the minimum requisite reliability, at a desired level of confidence to satisfy federal regulatory requirements in distinguishing between the two ATDs in the static compliance condition. However, if at least one margin is negative, the desired reliability and confidence cannot be claimed.

The constant value "K" utilized in the above calculations is a function of the number of samples which are tested, the minimum reliability that is to be demonstrated, and the level of desired confidence. For example, in order to demonstrate a minimum reliability of 95% with confidence of 90% (R95 C90), for purpose of the method according to the invention, the following constant values are to be used.

| n (sample size) | K |
| --- | --- |
| 3 | 5.310 |
| 4 | 3.957 |
| 5 | 3.400 |
| 6 | 3.091 |
| 7 | 2.894 |
| 8 | 2.755 |

As can be seen from this table, the larger the number of samples tested, the smaller the value of k which can be used to establish the margin as depicted in FIG. 1.

Figure 3:
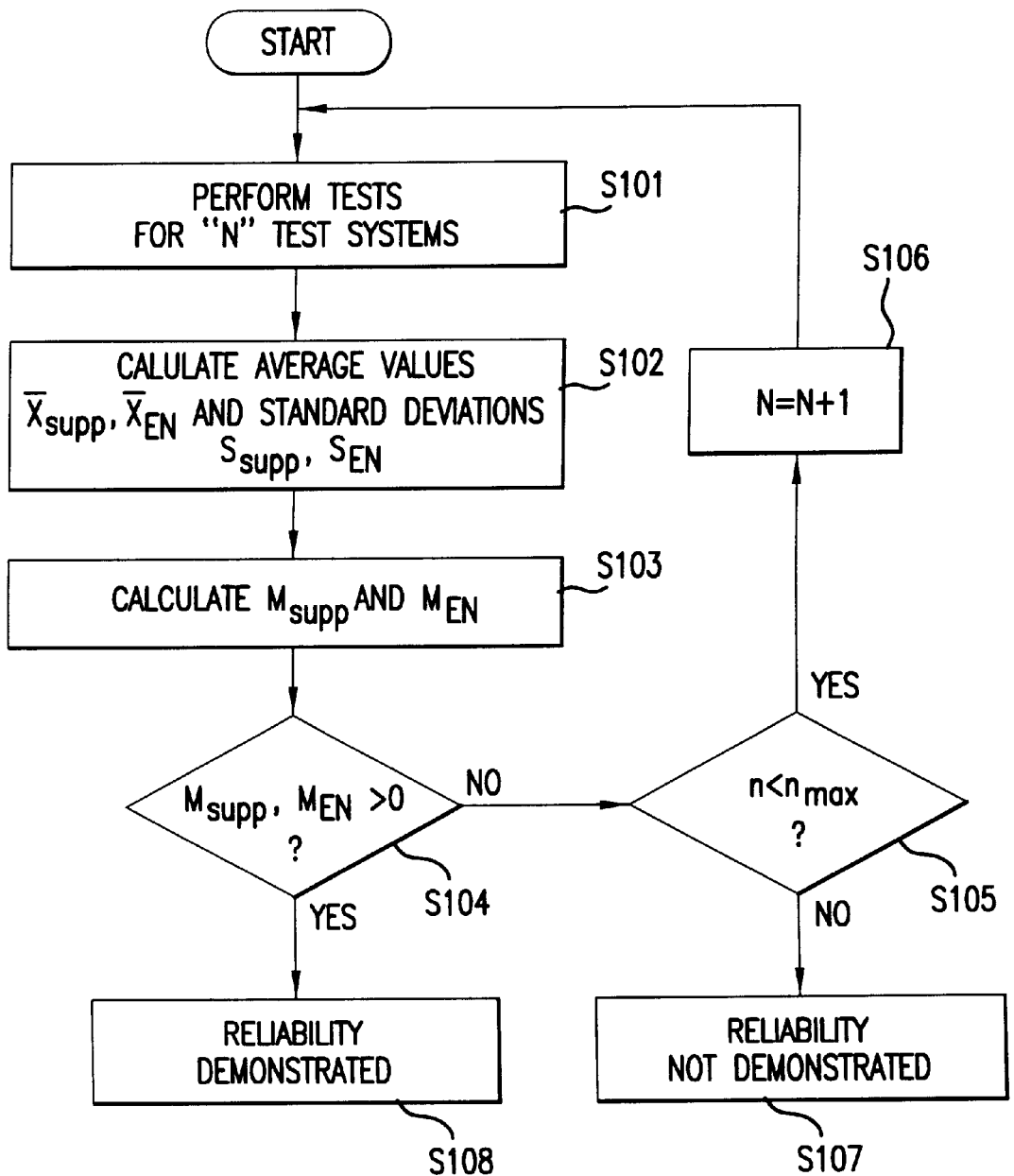
FIG. 3 is a flow diagram which illustrates the steps of the method according to the invention.

FIG. 3 is a flow diagram which illustrates the steps performed in the process according to the invention. In step S101, a series of tests is performed for a sample of "n" systems (in the example, n=3), utilizing a fifth percentile female ATD (representing a case in which passenger airbag deployment should be enabled), and a six-year old ATD (representing a case in which deployment of the passenger airbag should be suppressed).

Thereafter, in step S102, average values $\overline{X}_{Supp}$, $\overline{X}_{En}$ and standard deviation values $S_{Supp}$ and $S_{En}$ are calculated for each of the two cases. Thereafter, in step S103, the margins $M_{Supp}$ and $M_{En}$ are calculated, as provided previously in Equations 1 and 2. If both of these margins are non-negative (step S104), which they are in this example, the minimum reliability and confidence that the sensor system can discriminate between the target classes is demonstrated, (step S108). If, however, in step S104, at least one of the margins has a negative value, and if the number of test samples n that have been tested thus far is less than a maximum value $n_{max}$ (for example, n=8) in step S105, the value of n is incremented by one (i.e., one more sample is tested) in step S106, and the process is repeated. If, however, in step S105, the maximum number of systems $n_{max}$ has been used, and the value of $M_{Supp}$ or $M_{En}$ remains negative in S104, then reliability of the system is not demonstrated (step S107).

Figure 4:
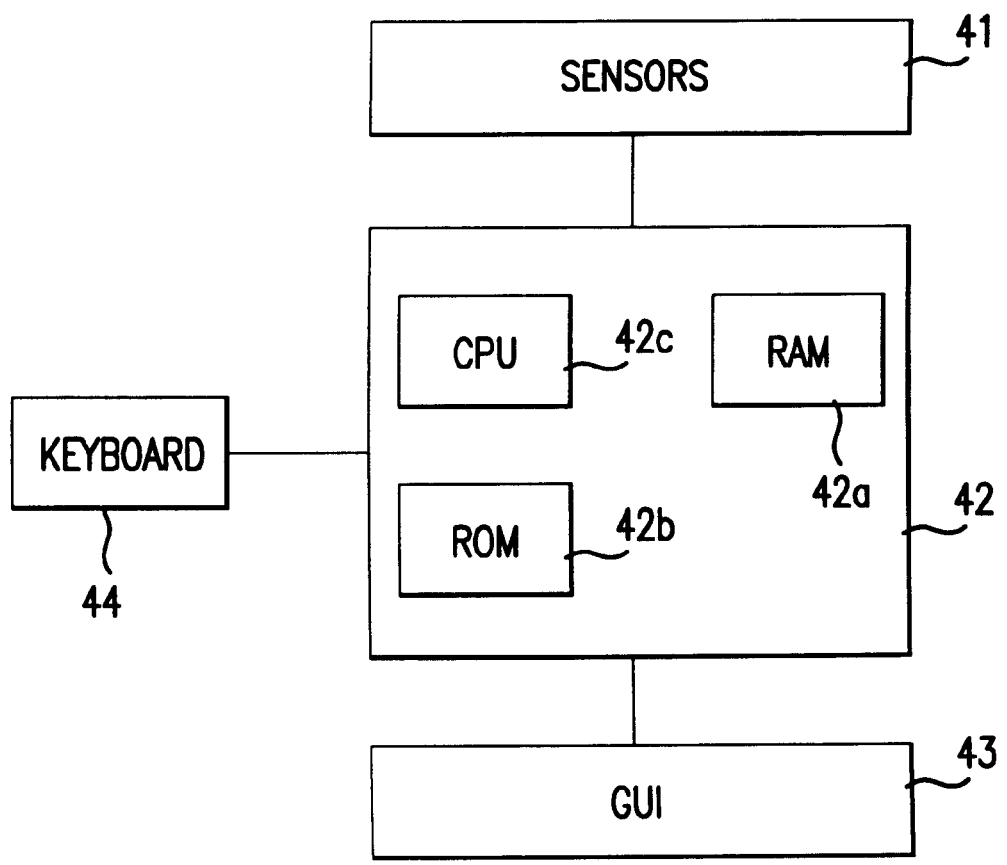
FIG. 4 is a schematic block diagram which depicts a system for implementing the method according to the invention.

FIG. 4 is a conceptual block diagram of a system according to the invention for testing the reliability of an occupant sensing system as described above. A suite a sensors 41 of the type described previously are used to measure test values for each of the n test systems. The test values are communicated to a computer 42 and stored in a random access memory 42a (RAM). The computer also has stored therein, for example in a read only memory 42b (ROM), a computer program for causing the CPU 42c to perform the manipulations called for in steps S101–S106 in FIG. 3, using the data stored in the random access memory 42a. A graphic user interface 43 is used to display test results, and a keyboard 44 is provided for user control and entry of data and commands. The computer 42 may also include an analog to digital converter for digitizing the test results provided by the sensors 41, if necessary.

Figure 2:
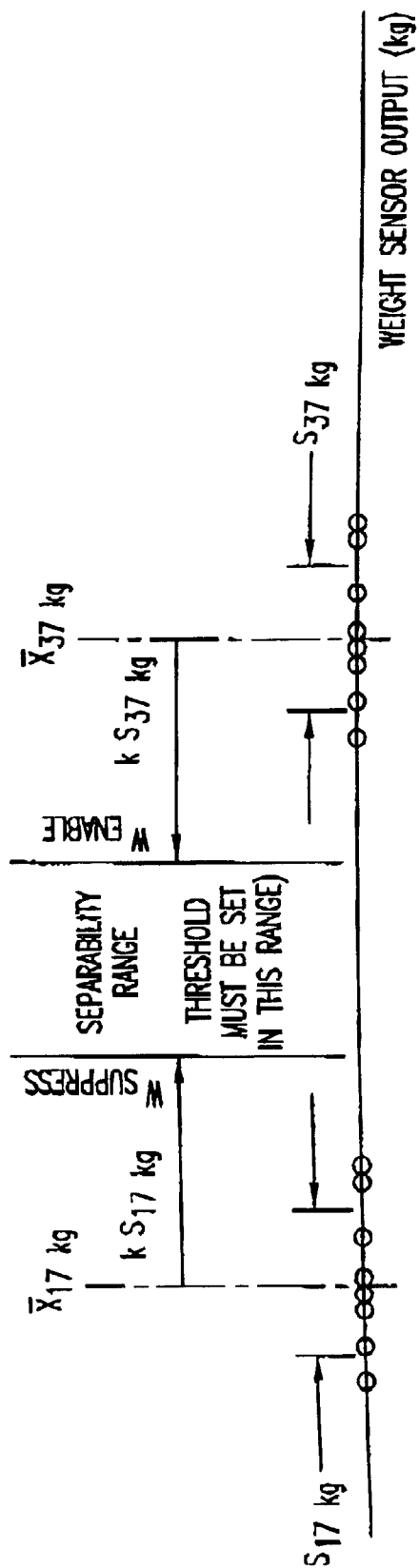
FIG. 2 is a graphic depiction of test results and calculated values for determining a range within which a valid suppression/enable threshold can be set for a particular weight sensing system.

The method and apparatus according to the invention can also be used to evaluate the feasibility of establishing a suppression/enable threshold for reliably discriminating between two classes of vehicle occupants as described above, with respect to a newly designed weight discrimination system. FIG. 2 is a graphic depiction of the test results for a series of n-samples of a weight sensing system which is designed to distinguish reliably between a 17 kg test weight (which may be considered to be representative, for example, of a twelve-month old ATD, plus an RFIS, plus associated cargo) and a 37 kg test weight (which may be considered to be representative of the seated weight of a fifth percentile female ATD). The purpose of the exercise depicted in FIG. 2 is to determine whether there exists a separability range within which a suppression/enable threshold may be set for consistently distinguishing between the 17 kg and 37 kg cases.

Once again, assuming that a larger occupant produces a larger value of the sensed parameter, two bounds are computed as follows. The suppress limiting case bound is the mean of the suppress limiting case values, plus the appropriate constant K (determined in the same manner as described previously) times the sample standard deviation of the suppress limiting case samples. The enabling limiting case bound is the mean of the enabling limiting case values minus the same constant times the standard deviation of the enable limiting case samples. If the lower bound for the 37 kg weight is greater than the upper bound for the 17 kg weight, the minimum level of reliability is established, with the desired confidence level, so long as the suppression/enable threshold value is set within the separability range, as shown in FIG. 2.

It should be noted that in both of the above applications, sequential testing may be used. Initially, the test run will consist of three samples. Testing should be stopped as soon as the objective is achieved, or if the maximum number of samples (for example, n=8) is reached, whichever comes first. It is possible that the objective may not be accomplished.

As can be seen from the foregoing, the method and apparatus according to the invention provide for a sound demonstration of the required reliability of an occupant classification system, which can be accomplished by testing a number of systems or components that is considerably lower than that of other methods previously used. It also provides and identifies a range in which the threshold can be setwhile the Reliability goals are met. Finally, it provides the ability to evaluate the risk of non-compliance of occupant classification systems to federal requirements throughout the system development process, thereby simplifying and decreasing the cost of system design and development.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for estimating reliability of a system which classifies an occupant of a vehicle seat as an adult or a child based on output signals of at least one sensor that measures a parameter that characterizes said occupant, by comparing measured parameter values to a selected threshold value, said method comprising:

providing a first test object having a measurable parameter value that represents a lower boundary limit for an adult;

providing a second test object having a measurable parameter value that represents an upper boundary limit for a child, said upper boundary limit being smaller than said lower boundary limit for an adult;

testing each of a plurality of n said systems comprising a sample, using said first and second test objects to generate n first measured values and n second measured values, respectively;

calculating average and standard deviation of said first measured values;

calculating average and standard deviation of said second measured values;

determining for the first test object a first margin which is calculated as the surplus of average of said first values minus a constant times the standard deviation of the first values beyond said threshold value;

determining for the second test object a second margin which is calculated as the surplus of said threshold value beyond the average of the second values plus the constant times the standard deviation of the second values; and concluding that said system has a desired minimum reliability at a desired level of confidence if both of said first and second margins are positive.

2. The method according to claim 1, wherein said system is part of a passenger airbag system of a vehicle.

3. The method according to claim 1, wherein n is less than or equal to eight, and the constant is determined as a function of n, Reliability and confidence.

4. The method according to claim 3, wherein:

the method is performed initially with n=3, and is terminated if the desired minimum reliability is established;

if the desired minimum reliability is not established, n is incremented by 1 and the method is repeated; and processing continues until the desired degree of reliability is established or until n reaches a predetermined maximum value.

5. A method for evaluating reliability of a system for classifying an occupant of a vehicle seat as between a first occupant category that is limited by a lower boundary value and a second occupant category that is limited by an upper boundary value smaller than the lower boundary value of the first category, based on output signals of at least one sensor for measuring at least one parameter which characterizes said occupant, said method comprising:

providing first and second test objects having physical properties that are representative of said lower boundary value of same first occupant category and said upper boundary value of said second occupant category, respectively, said physical properties being characterized by said at least one parameter;

providing a sample of n vehicle seats, each of said seats including an embodiment of the system whose reliability is to be estimated;

measuring a first value of said at least one parameter for said first object in each vehicle seat in said sample, and a second value of said at least one parameter for said second object in each vehicle seat in said sample;

calculating average and standard deviation of said first and second measured values;

determining for the first test object a first margin which is calculated as the surplus of the average of said first values minus a constant times the standard deviation of the first values beyond the threshold value for said classification;

determining for the second test object a second margin which is calculated as the surplus of said threshold value beyond the average of the second values plus the constant times the standard deviation of the second values; and concluding that said system has a desired degree of reliability if both of said first and second margins are non-negative.

6. The method according to claim 5, wherein said system is part of a passenger airbag system of a vehicle.

7. The method according to claim 6, wherein said first category comprises an adult and said second category comprises a child.

8. The method according to claim 5, wherein:

said first test object is an anthropomorphic test device having at least one physical property that is characteristic of a small adult; and said second test object is an anthopomorphic test device having at least one physical property that is characteristic of a child.

9. The method according to claim 5, wherein n is less than or equal to eight, and the constant is determined as a function of n, Reliability and confidence.

10. The method according to claim 5, wherein:

the method is performed initially with n=3, and is completed if the desired degree of reliability is established;

if the desired degree of reliability is not established, n is incremented by 1 and the method is repeated; and processing continues until the desired degree of reliability is established or until n reaches a predetermined maximum value.

11. An apparatus for evaluating reliability of a system for classifying an occupant of a vehicle seat as an adult or a child based on output signals of at least one sensor for measuring a parameter that characterizes said occupant, by comparing measured parameter values to a selected threshold value, said apparatus comprising:

a digital computer adapted to receive output signals from said sensors, and having signal processing means for converting said signals to a form that is readable by said computer;

a memory contained in said computer and having capacity to store measured parameter values from said sensors for each system in a sample of n systems that are to be tested, which signals characterize a first test object having a measurable parameter value that represents a lower boundary limit for an adult, and a second test object having a measurable parameter value that represents an upper boundary limit for a child, said upper boundary limit being smaller than said lower boundary limit for an adult; and a computer readable medium contained in said computer and encoded with a program for causing said computer to perform the operations of:

calculating average and standard deviation for a set of first stored measured parameter values for said first test object, and for a set of second stored measured parameter values for said second test object;

determining for the first test object a first margin which is calculated as the surplus of the average of said first values minus a constant times the standard deviation of the first values beyond said threshold value;

determining for the second test object a second margin which is calculated as the surplus of said threshold value beyond the average of the second values plus the constant times the standard deviation of the second values; and concluding that said system has a desired minimum reliability if both of said first and second margins are non-negative.

12. The method according to claim 11, wherein said system is part of a passenger airbag system of a vehicle.

13. The method according to claim 11, wherein n is less than or equal to eight, and the constant is determined as a function of n, Reliability and confidence.

14. The apparatus according to claim 11, wherein:

n is initially set at three, and if the desired degree of reliability is established, the operations are ended;

if the desired degree of reliability is not established, n is incremented by 1 and the computer repeats said operations; and processing continues until the desired minimum reliability is demonstrated or until n reaches a preset maximum value, whichever comes first.

15. A method for evaluating whether a threshold value can be established for use in a system for reliably discriminating between adult and child occupants of a vehicle seat by comparing a measured weight value to said threshold value, said method comprising:

providing a first test object having a weight that corresponds to a lower boundary limit for an adult;

providing a second test object having a weight that represents an upper boundary limit for a child, said upper boundary value limit being smaller than said lower boundary limit for an adult;

testing each of a plurality of n said systems comprising a sample, using said first and second test objects to generate n first measured values and n second measured values, respectively;

calculating an average and a standard deviation of said first and second measured values;

calculating a first limit ease bound as the average of the first measured values minus a constant times the standard deviation of the first measured values;

calculating a second limit case bound as the average of the second measured values plus the constant times the standard deviation of the second measured values;

if the first limit case bound is greater than the second limit case bound, constructing a threshold whose value lies between the first and second limit case bounds will enable discrimination between adult and child seat occupants with a required degree of reliability.

* * * * *